(12) United States Patent
Yu

(10) Patent No.: US 8,918,466 B2
(45) Date of Patent: Dec. 23, 2014

(54) SYSTEM FOR EMAIL PROCESSING AND ANALYSIS

(75) Inventor: Tonny Yu, Hillsborough, CA (US)

(73) Assignee: Tonny Yu, Hillsborough, CA (US)

( * ) Notice: Subject to any disclaimer, the term of this patent is extended or adjusted under 35 U.S.C. 154(b) by 2251 days.

(21) Appl. No.: 11/076,577

(22) Filed: Mar. 8, 2005

(65) Prior Publication Data

US 2005/0262209 A1 Nov. 24, 2005

Related U.S. Application Data

(60) Provisional application No. 60/551,959, filed on Mar. 9, 2004.

(51) Int. Cl.
*G06F 15/16* (2006.01)
*H04L 12/58* (2006.01)

(52) U.S. Cl.
CPC ............... *H04L 51/28* (2013.01); *H04L 51/12* (2013.01)
USPC .................................................. 709/206

(58) Field of Classification Search
CPC .... H04L 51/12; H04L 51/585; H04L 63/1441
USPC .......................................................... 709/206
See application file for complete search history.

(56) References Cited

U.S. PATENT DOCUMENTS

| | | |
|---|---|---|
| 5,371,807 A | 12/1994 | Register et al. |
| 5,694,616 A | 12/1997 | Johnson et al. |
| 5,742,769 A | 4/1998 | Lee et al. |
| 5,781,857 A | 7/1998 | Hwang et al. |
| 5,809,020 A | 9/1998 | Bruckert et al. |

(Continued)

OTHER PUBLICATIONS

S. Wallace. Programming Web Graphics with Perl and GNU Software. O'Reilly Media. Feb. 1, 1999. pp. 1-5.*

(Continued)

*Primary Examiner* — John Macilwinen

(57) ABSTRACT

Various features are provided for analyzing and processing email messages including determining if an email message is unwanted, and blocking unwanted messages. Email traffic is monitored by analyzing email messages addressed to known invalid email addresses. Email messages addressed to invalid email addresses are sent to a central control site for analysis. One embodiment tries to ensure that the distance between the invalid addresses and closest valid addresses is significant enough so that the invalid addresses are not inadvertently used for non-spam purposes. Another embodiment of the invention provides for distributed "thin client" processes to run on computer systems or other processing platforms. The thin clients emulate an open relay computer. Attempts at exploiting the apparent open relay computer are reported to a control center and the relay of email messages can be inhibited. Another embodiment provides for analysis and tuning of rules to detect spam and legitimate email. The approach adjusts various factors according to changing, current email data that is gathered from present, or recent, email traffic. Another embodiment takes into account statistics of erroneous and intentional misspellings. Groups of similar content items (e.g., words, phrases, images, ASCII text, etc.) are correlated and analysis can proceed after substitution of items in the group with other items in the group so that a more accurate detection of "sameness" of content can be achieved. Another embodiment uses authentication and security methods for validating email senders, detecting the sameness of messages, tracking the reputation of the sender, and tracking the behavior of the sender. Another embodiment profiles users to intelligently organize user data, including adapting spam detection according to a user's perceived interests.

21 Claims, 3 Drawing Sheets

(56) References Cited

U.S. PATENT DOCUMENTS

| | | | |
|---|---|---|---|
| 5,822,526 A | 10/1998 | Waskiewicz | |
| 5,878,230 A | 3/1999 | Weber et al. | |
| 5,978,799 A | 11/1999 | Hirsch | |
| 5,987,609 A | 11/1999 | Hasebe | |
| 5,999,967 A | 12/1999 | Sunsted | |
| 6,023,723 A | 2/2000 | McCormick et al. | |
| 6,052,709 A | 4/2000 | Paul | |
| 6,104,500 A | 8/2000 | Alam et al. | |
| 6,108,688 A | 8/2000 | Nielsen | |
| 6,108,691 A | 8/2000 | Lee et al. | |
| 6,118,856 A | 9/2000 | Paarsmarkt et al. | |
| 6,141,695 A | 10/2000 | Sekiquchi et al. | |
| 6,161,130 A | 12/2000 | Horvitz et al. | |
| 6,178,442 B1 * | 1/2001 | Yamazaki | 709/206 |
| 6,199,103 B1 * | 3/2001 | Sakaguchi et al. | 709/206 |
| 6,223,213 B1 | 4/2001 | Cleron et al. | |
| 6,249,807 B1 | 6/2001 | Shaw et al. | |
| 6,272,532 B1 | 8/2001 | Feinleib | |
| 6,282,565 B1 | 8/2001 | Shaw et al. | |
| 6,289,214 B1 | 9/2001 | Backstrom | |
| 6,304,898 B1 | 10/2001 | Shiigi | |
| 6,321,267 B1 | 11/2001 | Donaldson | |
| 6,324,569 B1 | 11/2001 | Ogilvie et al. | |
| 6,330,589 B1 | 12/2001 | Kennedy | |
| 6,330,590 B1 | 12/2001 | Cotten | |
| 6,351,523 B1 | 2/2002 | Detlef | |
| 6,363,414 B1 | 3/2002 | Nicholls et al. | |
| 6,374,292 B1 | 4/2002 | Srivastava et al. | |
| 6,401,112 B1 | 6/2002 | Boyer et al. | |
| 6,405,225 B1 | 6/2002 | Apfel et al. | |
| 6,405,243 B1 | 6/2002 | Nielson | |
| 6,413,000 B1 | 7/2002 | Borcherds et al. | |
| 6,421,709 B1 | 7/2002 | McCormick | |
| 6,424,426 B1 | 7/2002 | Henry | |
| 6,438,584 B1 | 8/2002 | Powers | |
| 6,443,841 B1 | 9/2002 | Rossides | |
| 6,446,115 B2 | 9/2002 | Powers | |
| 6,446,261 B1 | 9/2002 | Rosser | |
| 6,460,075 B2 | 10/2002 | Krueger et al. | |
| 6,473,812 B2 | 10/2002 | Motoyama | |
| 6,487,586 B2 | 11/2002 | Ogilvie et al. | |
| 6,502,127 B1 | 12/2002 | Edwards et al. | |
| 6,522,421 B2 | 2/2003 | Chapman et al. | |
| 6,526,042 B1 | 2/2003 | Pinard et al. | |
| 6,529,908 B1 | 3/2003 | Piett et al. | |
| 6,539,385 B1 | 3/2003 | Pollack et al. | |
| 6,546,416 B1 | 4/2003 | Kirsch | |
| 6,546,417 B1 | 4/2003 | Baker | |
| 6,580,787 B1 | 6/2003 | Akhteruzzaman et al. | |
| 6,587,871 B1 | 7/2003 | Schrader | |
| 6,591,296 B1 | 7/2003 | Ghanime | |
| 6,592,627 B1 | 7/2003 | Agrawal et al. | |
| 6,600,750 B1 | 7/2003 | Joffe et al. | |
| 6,614,551 B1 | 9/2003 | Peek | |
| 6,615,241 B1 | 9/2003 | Miller et al. | |
| 6,643,687 B1 | 11/2003 | Dickie et al. | |
| 6,651,879 B2 | 11/2003 | Lapstun et al. | |
| 6,654,787 B1 * | 11/2003 | Aronson et al. | 709/206 |
| 6,671,718 B1 | 12/2003 | Meister et al. | |
| 6,684,088 B1 | 1/2004 | Halahmi | |
| 6,684,238 B1 | 1/2004 | Dutta | |
| 6,691,156 B1 | 2/2004 | Drummond et al. | |
| 6,732,149 B1 | 5/2004 | Kephart | |
| 6,732,157 B1 | 5/2004 | Gordon et al. | |
| 6,779,021 B1 * | 8/2004 | Bates et al. | 709/206 |
| 6,842,773 B1 | 1/2005 | Ralston et al. | |
| 6,845,374 B1 | 1/2005 | Oliver et al. | |
| 6,952,719 B1 * | 10/2005 | Harris | 709/206 |
| 7,158,986 B1 | 1/2007 | Oliver et al. | |
| 7,194,515 B2 | 3/2007 | Kirsch | |
| 7,194,681 B1 | 3/2007 | Horvitz | |
| 7,206,814 B2 | 4/2007 | Kirsch | |
| 7,219,148 B2 * | 5/2007 | Rounthwaite et al. | 709/224 |
| 7,249,162 B2 | 7/2007 | Rounthwaite et al. | |
| 7,249,175 B1 | 7/2007 | Donaldson | |
| 7,272,853 B2 | 9/2007 | Goodman et al. | |
| 7,287,060 B1 | 10/2007 | McCown et al. | |
| 7,299,261 B1 * | 11/2007 | Oliver et al. | 709/206 |
| 7,343,624 B1 | 3/2008 | Rihn et al. | |
| 7,353,539 B2 | 4/2008 | Brawn et al. | |
| 7,366,761 B2 | 4/2008 | Murray et al. | |
| 7,406,502 B1 * | 7/2008 | Oliver et al. | 709/206 |
| 7,412,723 B2 | 8/2008 | Blake et al. | |
| 7,451,487 B2 | 11/2008 | Oliver et al. | |
| 7,483,951 B2 | 1/2009 | Kirsch | |
| 7,539,726 B1 | 5/2009 | Wilson et al. | |
| 7,546,348 B2 | 6/2009 | Wilson et al. | |
| 7,562,122 B2 | 7/2009 | Oliver et al. | |
| 7,590,694 B2 | 9/2009 | Yu | |
| 7,665,140 B2 | 2/2010 | Oliver et al. | |
| 2002/0103914 A1 | 8/2002 | Dutta et al. | |
| 2003/0069936 A1 * | 4/2003 | Warner et al. | 709/206 |
| 2003/0158725 A1 | 8/2003 | Woods | |
| 2003/0212745 A1 * | 11/2003 | Caughey | 709/206 |
| 2004/0039786 A1 | 2/2004 | Horvitz | |
| 2004/0087300 A1 | 5/2004 | Lewis | |
| 2004/0093384 A1 * | 5/2004 | Shipp | 709/206 |
| 2004/0107386 A1 | 6/2004 | Burdick et al. | |
| 2004/0128355 A1 * | 7/2004 | Chao et al. | 709/206 |
| 2004/0260776 A1 * | 12/2004 | Starbuck et al. | 709/206 |
| 2005/0060643 A1 | 3/2005 | Glass et al. | |
| 2005/0080860 A1 | 4/2005 | Daniell et al. | |
| 2005/0097179 A1 | 5/2005 | Orme | |
| 2005/0193073 A1 | 9/2005 | Mehr et al. | |
| 2007/0043817 A1 | 2/2007 | Oliver et al. | |
| 2008/0104187 A1 | 5/2008 | Wilson et al. | |
| 2008/0104703 A1 | 5/2008 | Rihn et al. | |
| 2008/0104712 A1 | 5/2008 | Oliver et al. | |
| 2008/0133686 A1 | 6/2008 | Wilson et al. | |
| 2008/0147857 A1 | 6/2008 | Oliver et al. | |
| 2008/0189253 A1 | 8/2008 | Oliver et al. | |
| 2009/0089272 A1 | 4/2009 | Oliver et al. | |

OTHER PUBLICATIONS

L. Oudot. Fighting Spammers with Honeypots: Parts 1 and 2. Nov. 26, 2003. pp. 1-15.*

SpamSieve Manual. http://web.archive.org/web/20031002044913/www.c-command.com/spamsieve/manual.shtml. Oct. 2003. pp. 1-42.*

Robinson, Gary. "A Statistical Approach to the Spam Problem". Linux Journal. Mar. 1, 2003. pp. 1-9.*

Androustopoulos, Ion et al. "Learning to Filter Spam E-Mail: A Comparison of a Naïve Bayesian and a Memory-Based Approach" Proceedings of the workshop Machine Learning and Textual Information Access. Lyon, France. Sep. 2000. pp. 1-12.*

Ahmed, Sabbir, et al., "Word Stemming to Enhance Spam Filtering," Department of Computer Science & Engineering, University of Dhaka, Bangladesh, Jul. 1, 2004, 2 pages.

Graham, Paul, "A Plan for Spam," Aug. 2002, 8 pages http://paulgraham.com/spam.html.

Graham-Cumming, John, "Welcome to POPFile," SourceForge™.net; © 2001-2004; 5 pages, http://popfile.sourceforgenet/old_index.html.

Sahami, Mehran, et al., "A Bayesian Approach to Filtering Junk E-Mail," AAA'98 Workshop on Learning for Text Categorization, Jul. 27, 1998, Madison, WI, 8 pages.

Yerzunis, Bill, et al., Spam Conference 2005 Abstracts, 14 pages, http://spamconference.org/abstracts.html.

Moore, et al.; Mailshell, the OEM Anti-Spam Leader; http://www.mailshell.com/mail/client/oem2.html/step/ip, 1 page. 2005.

* cited by examiner

SYSTEM FOR EMAIL PROCESSING AND ANALYSIS

CLAIM OF PRIORITY

This invention claims priority from U.S. Provisional Patent Application Ser. No. 60/551,959 filed on Mar. 9, 2004 which is hereby incorporated by reference as if set forth in full in this specification.

BACKGROUND OF THE INVENTION

This invention is related in general to processing of digital information and more specifically to the sending, delivery, analysis and other processing of electronic mail (email) messages.

Although email has become immensely popular and is a huge benefit for many users, today's email systems are also plagued by increasing numbers of unwanted mail, referred to as "spam." Spam email has reached such large proportions with respect to desired email that systems are now sought to defeat the sending and delivery of spam. Typically email is transferred over networks such as home or small-area networks, local-area networks (LANs), wide-area networks (WANs) and, ultimately, global networks such as the Internet. Although email represents the most popular general information exchange mechanism, the problem of unwanted information can include any type of information transfer over a digital network such as instant messaging, chat, newsgroups, file transfers, etc.

Spam is often difficult to detect because, in a broad sense, it is merely information that a recipient does not want. The analysis of an email message can attempt to determine the contents and meaning of a message, quantity of a message (i.e., whether it is a "bulk" message), sender, recipient, delivery path, and other characteristics in order to classify a message as spam. However, spam senders, or "spammers," are aware of such techniques and use countermeasures such as automatic modification of messages, varying the time or origin of bulk email transmissions, disguising email characteristics, etc. The battle between spam senders and spam blockers has reached very sophisticated levels and shows no signs of stopping.

Other practices of spammers that can be annoying to a recipient include obtaining information about the recipient for later use in sales or commerce. For example, sellers often desire any type of information on a potential customer such as whether an email address is valid, the likes/dislikes of the customer, etc. On the other hand, users desire to keep such information confidential or otherwise restricted.

Thus, it is desirable to provide features for email analysis and handling, and information processing in general, to either thwart or assist senders and/or recipients on email systems and other information exchange systems and to analyze and obtain information about user's of such systems.

SUMMARY OF THE INVENTION

A preferred embodiment of the invention provides various features for monitoring email traffic by analyzing email messages addressed to invalid email addresses. Email addressed to invalid email addresses is sent to a central control site for analysis. One embodiment tries to ensure that the distance between the invalid addresses and closest valid addresses is significant enough to avoid collecting legitimately mis-addressed messages.

Another embodiment of the invention provides for distributed "thin client" processes to run on computer systems or other processing platforms. The thin clients emulate an open relay, open proxy, hacked, or some other exploitable computer. Attempts at exploiting the apparent compromised computer are reported to a control center and analyzed to identify the spammers and their attributes.

Another embodiment provides for analysis and tuning of rules to detect spam and legitimate email. The approach adjusts various factors according to changing, current email data that is gathered from present, or recent, email traffic.

Another embodiment takes into account statistics of erroneous and intentional misspellings. Groups of similar content items (e.g., words, phrases, images, ASCII text, etc.) are correlated and analysis can proceed after substitution of items in the group with other items in the group so that a more accurate detection of "sameness" of content can be achieved. The presence of intentionally misspelled spam-like words is also used as an indication that a message could be spam.

Another embodiment uses authentication and security methods for validating email senders, detecting sameness of messages, tracking the reputation of the sender, and tracking the behavior of the sender.

Another embodiment profiles users to intelligently organize user data, including adapting spam detection according to a user's perceived interests.

In one embodiment the invention provides a method for analyzing email, the method comprising analyzing email messages sent to invalid email addresses, wherein the known invalid email address is greater than a predetermined distance from a closest valid email address; and using information about the email messages sent to invalid email addresses.

Another embodiment provides a method for analyzing spamming computer systems in a digital network, the method comprising loading a process onto a target computer system, whereby execution of the process by the target computer system allows an external computer system to perceive the target computer system as exploitable; and using a control center to receive email messages received by the target computer.

Another embodiment provides a method for analyzing email messages to determine if the email messages are spam, the method comprising assigning a higher weight to email attributes that are difficult to modify and/or viewable in email clients; and using the assigned weights in an analysis to determine a likelihood that an email message is spam.

Another embodiment provides a method for analyzing email messages, comprising predefining a group of two or more items that have similar meaning; determining when an item in the group is present in an email message; substituting the identified item with another item in the group; and analyzing the email message using the substituted item. The presence of intentionally misspelled spam-like words is also used as an indication that a message could be spam.

Another embodiment provides a method for presenting information to a user on a computer system, wherein the computer system includes a user input device, the method comprising determining the user's interests by obtaining data from the user input device; using the determined interests in ranking an email message according to the user's interests; and if the ranking is above a predetermined threshold then providing the email message to the user, otherwise filtering the email message from the user.

DETAILED DESCRIPTION OF THE INVENTION

Figure 1:
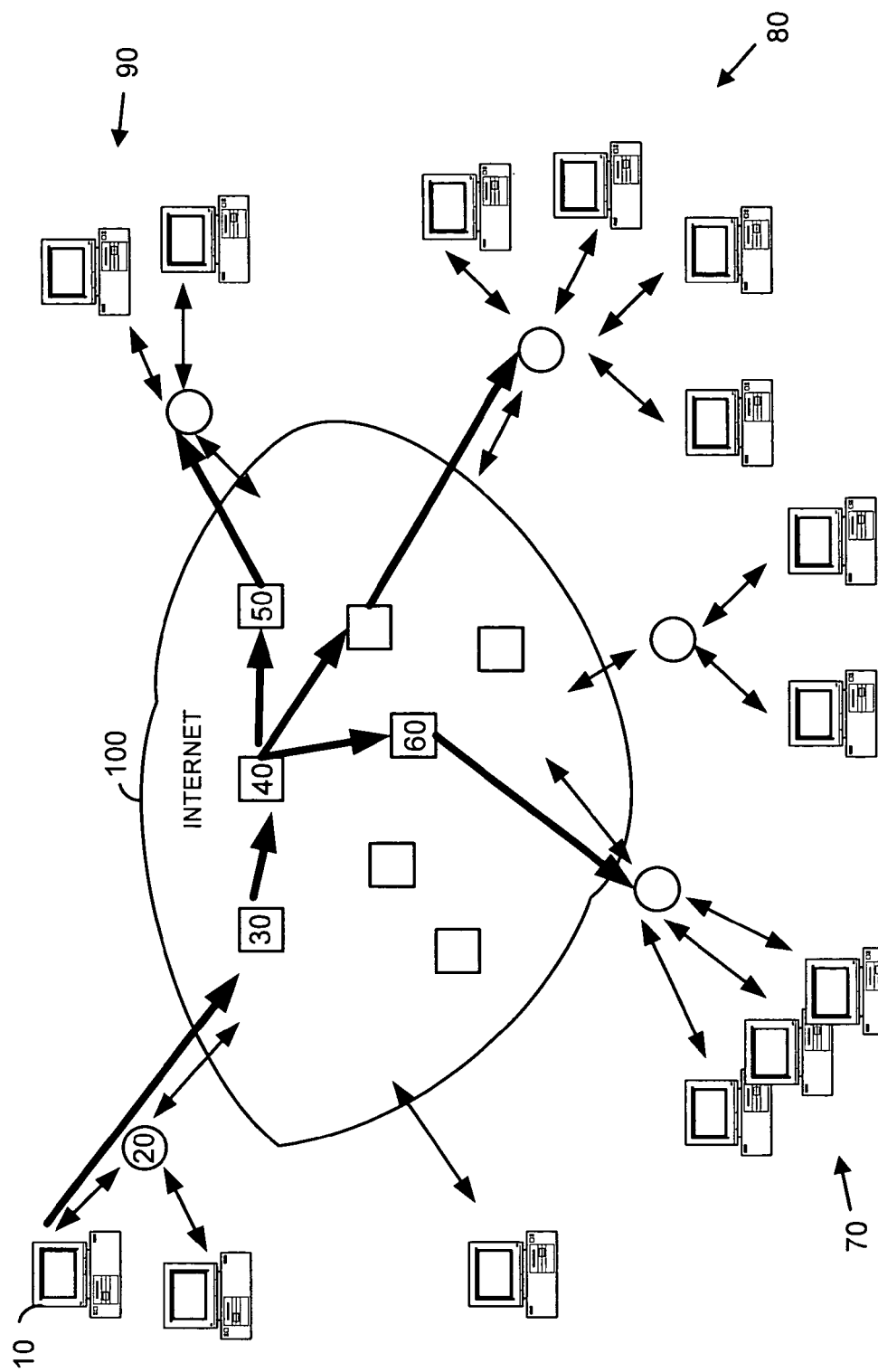
FIG. 1 is a prior art diagram of an email network.

FIG. 1 illustrates general characteristics of an email system using a digital network such as the Internet. Although the invention is discussed primarily with respect to email transferred over the Internet, any suitable network, network topology, transmission protocols, sender-receiver devices and relationships, and other characteristics or properties of electronic devices, processes and transmission methods can be used. For example, features of the invention can be employed on a smaller scale to local area networks (LANs), campus or corporate networks, home networks, etc.

In FIG. 1, a sender at a client computer such as client computer 10 can create and send an email message to email server 20. Email server 20 transfers the email over Internet 100 to recipients at 70, 80 and 90. The email can be transferred, for example, through servers such as 30, 40, 50 and 60 before reaching local email servers that provide the email to the intended recipients. In the case of spam email, the email is usually intended for many thousands, hundreds of thousands, or more recipients. The diagram in FIG. 1 is a much simplified depiction of the Internet and a user base. In general, any number of users, devices, components and processes, in one or more networks can make up an email distribution system. The communication channels can be optical, wired, wireless, or other transmission means.

Although embodiments of the invention are discussed primarily with respect to server-client architecture, any acceptable architecture, topology, protocols, or other network and digital processing features can be employed. In general, servers 30, 40, 50 and 60 can be any device with processing ability or other functionality. For example, some of the functions described herein can be performed with devices that are considered clients, such as a user computer system. It is also possible that functionality relevant to the present invention can be included in a router, switch, storage device or other device.

Any type of processing devices can be used to send and receive email. For example, portable computing devices such as a personal digital assistant (PDA), cell phone, laptop computer, or other devices can be employed. In general, the devices and manner of specific processing (including location and timing) are not critical to practicing important features of the present invention.

In FIG. 1, the bold arrows show the path of email transfer, from sender 10 through local email server 20 through other servers to recipients at 70, 80 and 90. The adaptable design of the Internet often means that the particular servers through which information travels is unpredictable. In some cases, an Internet service provider (ISP) or other entity that provides email services may operate one or more email servers, and at least the initial, or final, servers that are used in an email transfer will be guaranteed to flow through the ISP servers from a given sender or for a given recipient. However, in the general case it is difficult to determine the intermediary servers (or other network devices) through which the email flows.

The bold arrows in FIG. 1 illustrate propagation and multiplication of an email message. Multiplication, or replication of email can occur at any point where there is a processor. For example, sender 10 can execute a program on the sender's computer to generate a single email with a long list of intended recipients. In such case the single email may be replicated at email server 20, or may be replicated at subsequent points, such as at intermediary server 40, where it can be transferred to other servers for replication, routing and ultimate delivery. This approach has drawbacks for the bulk email sender since it is easy to detect such bulk mailings and to block, or filter, identical email messages intended for many recipients.

Another approach for a bulk email sender is to vary the text of the messages and to send each variation of the message to a subset of the intended recipients while spacing the deliveries over time. The variation of an original email message can be done automatically and the sending over time can also be automated as where periodic mailings are performed on a schedule. The automation of this approach can occur at any servers (or other devices) that are connected to the Internet or to a subnetwork. With this approach it can be very difficult to detect and block unwanted (i.e., spam) email.

One embodiment of the invention provides for "analyzing" email transmissions by analyzing email messages addressed to email addresses that are known to be invalid. That is, the non-existent email addresses are not associated with any human user, process or service other than their use in probing, detecting and analyzing email messages and email networks. One practical use of this technique is to identify spam email messages and prevent the delivery of such messages to the intended recipients.

Figure 2:
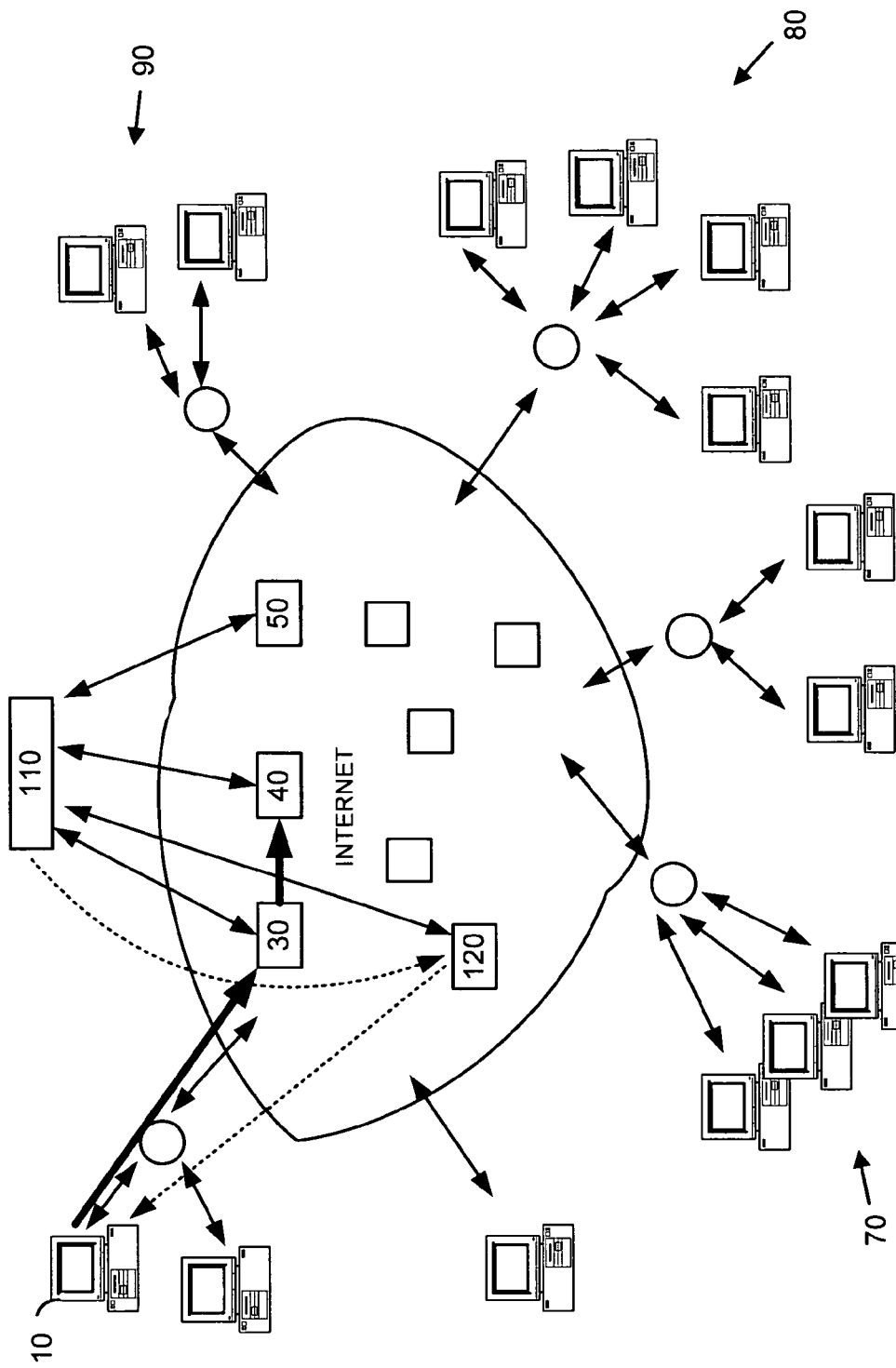
FIG. 2 illustrates an email network including a control center according to an embodiment of the present invention.

FIG. 2 illustrates a preferred embodiment of a non-existent address network. In FIG. 2, control center 110 is in communication with several servers such as 30, 40 and 50 corresponding to the same servers of like numbers in FIG. 1. Control center 110 can include, for example, a server, process or other system that perform is the functions described herein.

When sender 10 tries to send email to a non-existent email address, the servers that are in communication with control center 110 can provide the email to the control center. The control center can act to analyze the email and direct the servers to block the email from further transmission. Note that either the control center or the individual servers can perform many of the functions of the non-existent network. One benefit to using a control center for much of the processing is that the control center can obtain information from different places in the Internet, thus providing a more statistically accurate decision as to whether email is spam.

Servers can send only some of the email to the control center for analysis. For example, one of every 100 email messages sent to a non-existent address can be sent to the control center. Or a control center can make a decision as to which email messages that it receives are the "same". This evaluation of "sameness" can be done by one or more of the techniques described herein, or by other techniques that are known in the art, or by future techniques that may become available. A server can convert an email message to a hash value that can be sent to the control center for analysis with other hash values (e.g., from other servers) to determine if email messages are the same or similar for purposes of determining if the email messages are bulk email and/or spam.

Figure 3:
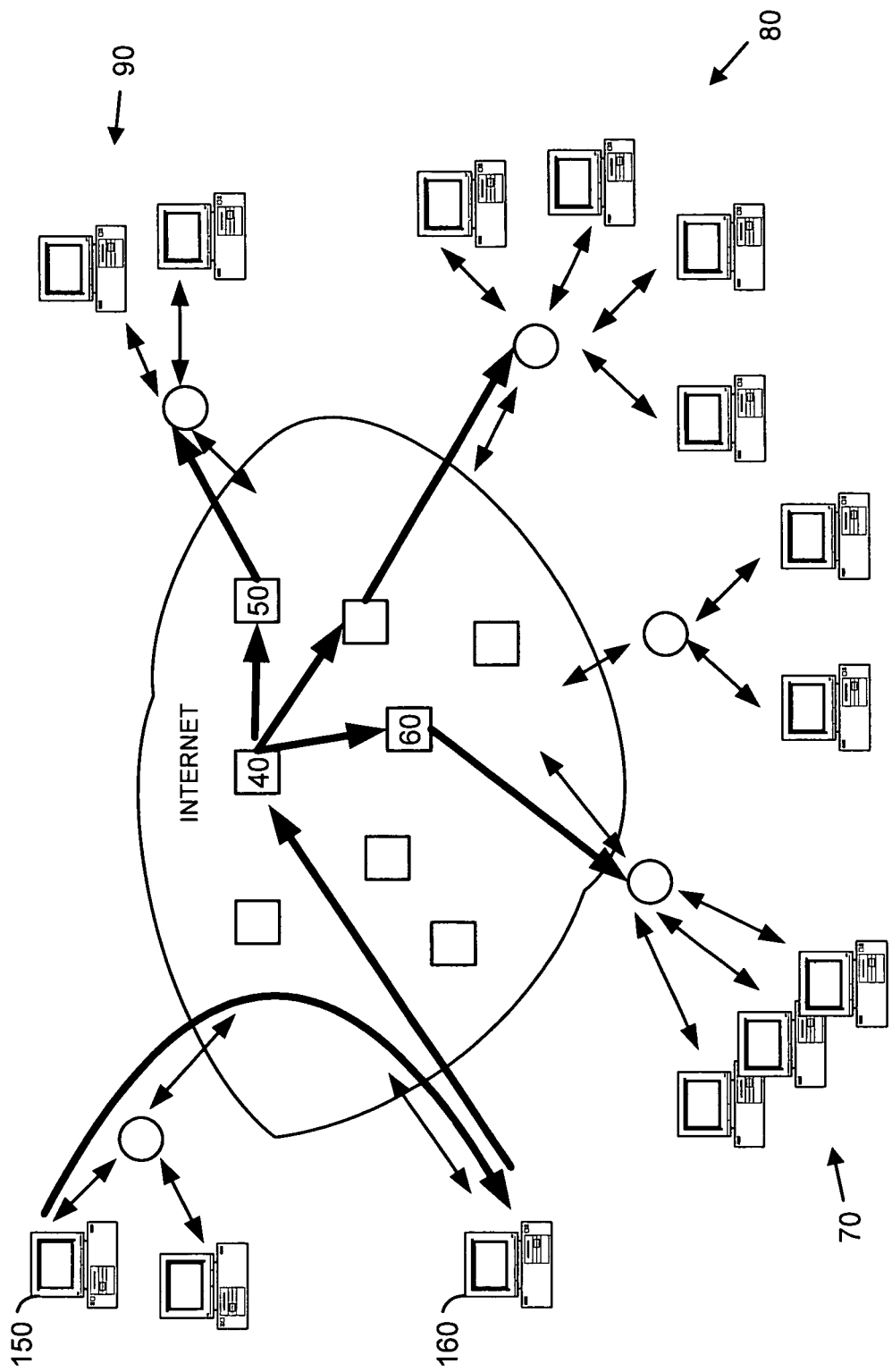
FIG. 3 is a prior art diagram of an email network using an open relay.

FIG. 3 illustrates a technique that spam senders can use to distribute email and remain hidden. By using "open email relays" or "open email proxies" a sender essentially uses a third party's computer system to send email. The email appears to have originated from the third party's computer system. This approach can be used on any number of computer systems that are "open", have the ability to perform open email relay, or are otherwise exploitable. Typically a third party's computer can be used by a sender, or spammer, without the third party's knowledge. In FIG. 3, sender 150 sends a relay program to user 160's computer. Once the relay program is installed, sender 150 can send instructions to generate email messages to different recipient addresses. Propagation of the email will be seen by devices on the Internet as originating from user 160, thus preventing the actual sender from being suppressed or otherwise caught.

In order to prevent open email relay spamming, one embodiment of the present invention uses computers set up to be "traps" for an email open email relay spammer. A computer, such as computer 160, is set up to look like an open computer system that can be controlled by sender 150. However, computer 160 is actually running a program (sometimes referred to herein as a "light-weight client" or "thin client") that, while appearing as an open relay, actually is designed to gather information and send it to a control center, similar to the control center approach of FIG. 2.

The control center can perform analysis on the email sent from thin clients to determine whether the email is bulk or spam email. The thin clients can be combined with other features discussed in this application. Any number of computers can be provided with thin clients so that the chances of detecting and stopping spam email sent by open email relay are increased. Methods to detect if messages are sent in bulk One embodiment of the invention provides methods to measure whether a message is wanted by users. A large amount of spam is being sent via open email relays, hacked computers, open proxies, web forms, etc. I want to network a massive set of volunteer servers to emulate one or all of those types of compromised systems and waste time and resources of spammers and collect accurate data on spammer behavior. Ways spammers can detect and avoid:
    test a large sample of messages
    periodically retest
    detect "trap" signature
    spread their attack among a large number of servers Features include:
a) A large network of light-weight clients.
b) Server/client which transparently emulates open proxies, open relays, virus infected machines, hacked machines, etc.
c) A system to analyze the traffic flow to identify spammers.

Details:
a) A large network of light-weight clients.
Like Seti and Napster, the user can specify:
    how much network bandwidth can be allocated for the network (e.g. 10 k/sec).
    which type of emulations that they want to allow:
        open proxy
        open relay
        virus infected
        web form
        all
    When the client should be active: time of day, time of week, when network is up, when no/low user activity, etc.
    Total number of proxied connections to each /32, /24, /16, and the whole Internet, in any 10 minute period
    Limit the number of connections that will be kept alive at the same time.
    Limit the rate of RCPT and VRFY commands sent to each target SMTP server.
    Choose mode for how data is sent
    Provide statistics as to the number of attacks and the number of spam blocked.
    Optional GUI of activity, status, and history.
    Enable tar pit. This will try and slow down the spammer server. However, this would unhide the client and make it easier for the spammer to detect.
    Option to allow publication of client location in public open-relay lists and directories.

Some spammers will try and verify the system first. For example, they may send themselves a message. The user can specify how many successful attempts they will allow per incoming IP address or range of IP addresses.
    Consistency in case the spammer checks periodically. Goal is to give user control over their resources and to fully appear real and undetectable to a spammer.
    Server/client which transparently emulates open proxies, open relays, and virus infected machines, hacked machines, etc.

The client securely connects to the Mailshell server. The Mailshell server provides updates and instructions to the client:
    Who to connect to
    What info to send out
    A system to analyze the traffic flow to identify spammers.
    Extract spam content, spam tricks, spam URLs, spam routing, etc.
    IPs used
    HELO
    MAIL FROM:
    RCPT TO:
    message content
    connection time
    Analyze spam messages
    Forge-resistent data: IP addresses, URLs, URL fragments, phone numbers, email addresses, message fingerprints, attachment fingerprints, bulkiness, etc. Viewable data: viewable words/phrases in From:, To:, Subject:, and Body
    Frequency of rule hits and word hits
    Trace forge-resistent data: owner of IP addresses, location of IP addresses, owner of domain names, domain registrars, name servers, spider web pages of URLs, check mail server banner of mail servers, reverse lookup phone numbers, etc.

Different approaches exist for determining whether an email message is unwanted email, or spam, or whether the email message is wanted email, or "ham." Spam has distinguishing characteristics or attributes from ham, but generally these attributes must be statistically analyzed and the outcome of the analysis is a probability (and not a certainty) that a message is spam or ham.

In order to improve the statistical success of spam attribute analysis, one embodiment of the invention provides a way to modify analysis parameters as more data becomes available, and as results of previous analysis are compared to current (and changing) data. One embodiment of the invention provides methods to combine the results of many rules into a single probability score Description The goal is to determine whether an email message is spam.
We create a set of message attributes including words, phrases, heuristics, spam tricks, etc.
We analyze the frequency of each message attribute in a collection of known spam messages and the frequency in a collection of known legitimate messages (ham). Based on these frequencies, we compute the spam probability weight of each message attribute. We compute the set of applicable message attributes for every new email message and we combine the spam probability weights of those applicable message attributes using a chi-square distribution scheme.

The issues are:
Spam changes constantly so the message attributes of new spam may be different from the message attributes of old spam.
Ham changes occasionally so the message attributes of new ham may be different from the message attributes of old ham.
Some message attributes can be slow to extract and compare.
Spammers can analyze the message attributes of common ham (e.g. major newsletters) and try to add these message attributes.
Message attributes can be obfuscated to appear unique.

To improve results:
weigh recent messages more than old messages. Especially for spam but less so for ham.
Normalize the entire message and un-obfuscate.
weigh unforgeable information more than easily forgeable data:
IP addresses, URLs, URL fragments, phone numbers, email addresses, layout fingerprints, message fingerprints, attachment fingerprints, etc.
Countries routing path, RBLs, and "bulkiness" attribute are generally hard to fake.
We want to more heavily weigh those message attributes which are difficult for spammers to fake, which spammers would like to fake, and that the legit sender is unlikely to fake.
weigh viewable data more than invisible data. What is viewable depends on the email client, but generally From, To, Date, Subject, and plain text body. There are a large number of tricks to add invisible text to HTML messages.
weigh dictionary language words more than non-alpha words. Non-alpha words are often faked. Include english, german, spanish, etc.
Include words collected from legitmate email and newsletters. Include trademark names, city, country, states, major domain names, and stock symbols and company names.
when stored attributes exceed specified maximum, delete the stored attributes which have the least usefulness. Usefulness is a function of abs (0.5-bayesian weight) and the frequency of the stored attribute. Lean toward keeping good ham indicators since they are rare and don't change as frequently.
weigh the type of spam. Generally, in order of unwantedness:
viruses/malware, fraud, offensive, and commercial
The weighting can be user configurable.
Extract N-grams and token combinations and track.
auto-training based on weight of computed spam score. Since it is difficult to manually determine known spam and known ham, can compute score and assume that a score above 99% is known spam and less than 1% is known ham.

Spammers try to obfuscate, or hide, the use of words that are often linked to spam. For example, "Viagra" can be substituted with other pharmacology terms for essentially the same drug. Or the word can be purposely misspelled such as replacing "Viagra" with "Viaagra". A phrase such as "lowest insurance rates" can be substituted with "lower your insurance now." Each substitution of a word or phrase for another that has essentially the same meaning makes it difficult to detect that email messages are the same in meaning.

One embodiment provides a thesaurus of words, phrases, symbols, images, or other items that can have the same meaning and indicates the correlation between two or more of the items. Thus, an item is looked up in the thesaurus by a matching process and any related item with a high correlation can be substituted during an analysis of the content of the messages. The degree of correlation can be used in a calculation of the sameness of the message with other messages in order to determine if the message is bulk and/or spam. The presence of intentionally misspelled spam-like words is also used as an indication that a message could be spam.

In a preferred embodiment, the system adapts to new uses of words by spammers by analyzing current Internet message traffic, including legitimate (ham) messages. One embodiment of the invention provides methods to detect if messages are sent in bulk, methods to measure whether a message is wanted by users and methods used to detect sameness and also used to detect offensive content.

Spammers are often mispelling or obfuscating certains words which are often linked to spam. The following are some common spam terms:
1. Viagra online (also: xanax, valium, xenical, phentermine, soma, celebrex, valtrex, zyban, fioricet, adipex, etc.)
2. Online pharmacy (also online prescriptions; meds online)
3. Get out of debt (also: special offer)
4. Get bigger (also: satisfy your partner; improve your sex life)
5. Online degree (also: online diploma)
6. Lowest mortgage rates (also: lower your mortgage rates; refinance; refi)
7. Lowest insurance rates (also: lower your insurance now)
8. Work from home (also: be your own boss)
9. Hot XXX action (also: teens; porn)
10. As seen on oprah I would like to add rules for those phrases as soon as possible. I would like to add rules as soon as possible to compensate for mispellings and ascii art:
The use of word variations, including whitespace insertions within words, to elude spam screens;
Misspellings of common spam terms; "Viagraa" or "Viaagra"
Numeric substitutions for certain letters within common junk e-mail words—such as a number 3 for an E and a number 1 for an I;
Foreign character subsitutions (e.g umlaut u for u)
Ascii art "/" for "V"
Non-ascii insertions "V.i.a.g.r.a"
Invisible text such as white text on white background.

In addition, would like to build a system which can learn new tricks being used by spammers.
Create a spam dictionary of common spam terms and phrases.
Create a ham dictionary of common legitimate words. Include english, german, spanish, etc.
Include words collected from legitmate email and newsletters. Include trademark names, city, country, states, major domain names, and stock symbols and company names.
Collect known spam.
For each word/phrase in the spam dictionary, search for a "close" match in the spam message.
Compute the number and type of transformations (e.g. letter subsitutions) required to convert the word/phrase in the spam message to the word/phrase in the spam dictionary.

Each type of transformation has a weight. Sum the weight of all transformations required to match the word/phrase in the spam dictionary. If it is below a threshold then assume that it is close enough.

For the word/phrase in the spam message which is close enough, try and match that word/phrase to the ham dictionary. Sum the weight of all transformations required to match the word/phrase to the ham dictionary. Divide this ham transformation weight by the weight of the spam transformation. If it is below a threshold, then assume that the word/phrase in the spam message is a new "spam indicator"

Create a list of "spam indicators" and search for them in incoming messages

Transformations:
    remove spaces
    delete non-alpha characters
    delete alpha characters
    add characters
    replace non-alpha characters
    replace alpha characters Examples for Viagra:
Vi-agra
VlAgR
Alternative:
    Run a CRM114 or N-gram search and extract N-gram matches.

Provide a GUI for the user for them to enter their own set of words for a custom spam dictionary and ham dictionary. Suggest alternate spellings. Allow user to enable fuzzy matching. Allow regular expressions.

Incoming email traffic is processed by identification (ID) modules. ID modules can each be independent processes, devices or other types of functionality that are designed to evaluate the similarity between two or more email messages, or between an email message and other reference data. For example, a module can be a software process that determines a word count in the body of an email message. Another module can eliminate minor differences in grammar and language properties (e.g., eliminating the distinction between number, tense and person in grammar) and then subject the email text to a hash function. Another module type can use a database to assign values to words and compute an overall value to an email message or other information in an email transmission. Another module type can attempt to deduce meanings or concepts conveyed in an email message. In general, any type of module that performs a comparison on an email message in an attempt to find a level or degree of "sameness" of the email message with other email messages or with a reference datum or data structure can be employed.

Modules are used to produce a value or values that indicate the degree of certainty that the module assigns to an email message to indicate whether the email message is matched to another email message or group of email messages (referred to as a category). In a preferred embodiment, a module can merely produce a "match" or "no match" with a message category. For example, there may be tens or hundreds or more different categories to which a candidate email message may be compared. Each module can produce a conclusion as to whether the candidate email message is matched to one or more of the categories. Alternatively, the modules can produce a "degree of certainty" value (e.g., from 0 to 100) that indicates the degree to which the module ascertains that the message is the same as the messages in each category. Other types of module comparisons and types of module output are possible. Typically, the checking for sameness is performed against one or more messages, or other information representing message content, obtained from a source such as database 150.

Filters use the results of the module comparisons to determine whether the email traffic is delivered to a user. Messages that are delivered, or "passed," are considered legitimate, or desired, messages. Messages that are undelivered are said to be blocked, or undesirable, messages. In a preferred embodiment, a filter performs a spam check on messages that are considered to be "bulk" messages. Bulk messages are those messages in a category that contains over X messages, where X is a predetermined number. Messages that are not bulk messages are automatically passed through to the intended recipient, or user. Bulk messages, on the other hand, are subjected to further scrutiny and checking to determine whether the messages are spam. Typically, this is a determination as to whether the message is of a commercial nature, i.e., is designed to benefit the sender monetarily or in some other fashion. The spam checking can be by any means as is known in the art.

Ideally, a system would be able to tell with certainty whether a message is bulk or not. In such a case, all non-bulk messages can be considered as not spam. However, since the bulk detection is not perfect, a preferred embodiment uses the probability that email is bulk combined with the probability that the email content may be unwanted to derive the overall probability that email is bulk and unwanted.

Performance evaluation includes a process that assesses the success or failure of specific modules to detect a match of email. For example, if a module has determined that an email message is the same as other email messages in category 1, and a benchmark evaluation reveals that the message is actually NOT the same as the email messages in category 1, the module is said to have failed at the matching process. Modules that fail more frequently than desired can be removed from use, or if they are still used less weight can be given to their conclusions. On the other hand, modules which are more successful than others can be weighted more heavily than other modules so that the successful modules have more influence in the overall decision of sameness than other modules. Completely useless or redundant modules can be removed. A module X is redundant if there exists another module Y which is right whenever module X is right. A partially useless module may still be deleted if the incremental value that it provides does not justify the cost of executing the module.

A benchmark evaluation can be achieved manually, as where it is performed by a human editor. Such an approach can periodically have a human editor review categorized email messages and determine if the sorting is proper. Module decisions as to the category can then be compared against the human editor and modules can be rated accordingly. Inter-module checking can also be performed where if a module often decides contrary to other modules, especially when the other modules are weighted highly, then the contrary module can be de-rated, or given a lower weighting in the overall result. A preferred embodiment uses Bayesian analysis to achieve this "tuning" of the module selection and weighting.

Module tuning and sameness checking can be applied to spam checking in addition to bulk detection. A preferred embodiment of the invention uses a process whereby if one message is identified to be spam, then all messages which are identified as the "same" as that message are also classified as spam. If one message is identified to be legitimate, then all messages which are identified as the "same" as that message is also legitimate.

Table I shows examples of different ID modules used to perform sameness checking.

TABLE I

| Module Name | Description |
| --- | --- |
| Nilsimsa | Uses nilsimsa fingerprints |
| DCC | Uses DCC checksums of messages, utilizes dccproc to get checksums |
| WordsWB | Using the whole message body, this module creates a hash |
| WordsF2K | Using only the first 2K bytes of the message body, this module creates a hash |
| WordsHB | Using only the first half of the message body, this module creates a hash |

Table II shows performance measurements of the modules in Table I

TABLE II

| (a) Module Name | (b) #says matches and is right | (c) #says matches and is wrong | (d) #says not matches and is right | (e) #says not matches and is wrong | (f) Bayesian Computed weight |
| --- | --- | --- | --- | --- | --- |
| Nilsimsa | 4317 | 5679 | 11691 | 813 | 0.72 |
| DCC | 2439 | 0 | 17370 | 2691 | 1.00 |
| WordsWB | 4571 | 669 | 16701 | 559 | 0.96 |
| WordsF2K | 4560 | 750 | 16620 | 341 | 0.95 |
| WordsHB | 4825 | 836 | 16534 | 305 | 0.95 |

In Table II, a determination as to whether the module is actually right or wrong is based on a human editor's decision as to whether the messages are the "same." One way to calculate a weight to assign to a module based on the results of Table II can be performed as follows (using the values denoted by the letters in parentheses in each column of Table II):

$$\text{ID Modules ``sameness'' probability} = f(w) = \frac{(s*x) + (n*p(w))}{s+n}$$

where
s=1.0
x–0.5
Size of "same" corpus=5130
Size of "not-same" corpus=17,370
Hits in "not-same" corpus=column (c)
Hits in "same" corpus=column (b)
n=#Hits in "same" corpus+#Hits in "not-same" corpus
b(w)=#Hits in "same" corpus/Size of "same" corpus
g(w)=#Hits in "not-same" corpus/Size of "not-same" corpus
p(w)=b(w)/(b(w)+g(w))

In a preferred embodiment, f(w) is calculated using Paul Graham's probability formula as outlined in "A Plan for Spam" http://www.paulgraham.com/spam.html with subsequent modifications by Gary Robinson in "A Statistical Approach to the Spam Problem" http://www.linuxjournal.com/article.php?sid=6467.

The calculation above is computed for each module used in a group of modules to evaluate sameness. Then, the preferred embodiment uses the overall "sameness" probability derived by combining the results of all of the modules using a chi-squared probability scheme which is described, for example, at http://mathworld.wolfram.com/Chi-SquaredDistribution.html, and is described as $$H = C^{-1}\left(-2 \ln \prod_w f(w), 2n\right)$$

There are many other alternative schemes to combine the module results and any suitable approach can be used.

By assuming that messages with a computed 99% or greater combined sameness probability are the same and those with a 1% or less combined sameness probability are not the same, the message sample can be used to tune the weights of the individual ID modules. In order to start a comparison process to determine if an email message is spam, it may be necessary to make a determination about at least one instance of the email message. One way this can be done is by observation and flagging an email as spam by a human editor. Another method is to allow a user or group of users to "vote" on whether the email is spam. The votes can be cross referenced by the ID modules, weighted by a user's reputation and tallied.

Embodiments of the invention include detecting if messages are sent in bulk and measuring whether a message is wanted by users.

Description

Used to detect sameness.

Goal is fast, accurate, and low resource algorithm to detect sameness.

Some ID Modules:
  weigh unforgeable information more than easily forgeable data. For example, Static IP addresses, class of dynamic IP addresses, URLs, domain names, postal addresses, phone numbers, email addresses, stock symbols, trademark names, etc. Normalize data.
  weigh viewable data more than invisible data. Normalize data. Remove obfuscation.
  compare % of rules which match weighed by their spam weight
  compare images and attachments
  N-gram matches
  compare % of words which match weighed by their abs (0.5-bayesian weight)

One embodiment of the invention uses security and access techniques to detect whether an email message has originated from a known, or identified, sender and to track the reputation of the sender and the volume of email sent by that sender. Traditional techniques such as authentication or other variations of asymmetrical (i.e., public key), symmetrical, or other encryption can be used. An authentication or other third-party entity can assist in the identification and authentication. Signatures, digital watermarks, passwords and other techniques can be employed. One embodiment provides for detecting if messages are sent in bulk and measuring whether a message is wanted by users. Message similarity is detected. Fast, accurate, and low resource usage are design goals.

Some ID Modules:
  weigh unforgeable information more than easily forgeable data. For example, Static IP addresses, class of dynamic IP addresses, URLs, domain names, postal addresses, phone numbers, email addresses, stock symbols, trademark names, etc. Normalize data.
  weigh viewable data more than invisible data. Normalize data. Remove obfuscation.
  compare % of rules which match weighed by their spam weight
  compare images and attachments
  N-gram matches
  compare % of words which match weighed by their abs (0.5-bayesian weight)

Another embodiment of the invention allows a user to be automatically profiled so that a more accurate determination of whether that user would want a specific email can be determined. For example, if a user shows an interest in sports by, e.g., visiting sports information websites, joining sports newsgroups, discussing sports in email messages, etc., the system would be more likely to permit email (even bulk or spam email) that deals with sports to reach the user. Incoming email that is selectively permitted to the user under this criteria or analysis can be sorted by, e.g., placing the email into a specific folder. The user can select whether to adjust parameters used in the selective permission, turn off the service entirely, etc.

One embodiment of the invention provides Methods to automatically profile the user to intelligently organize their data.

Description
  what is spam to one person may be wanted by another
  the goal is to categorize the user's data (e.g. email) and apply a set of actions
  the set of actions include:
    move the data somewhere (e.g. to a folder, email it)
    copy the data somewhere
    delete data
    execute some action (e.g. make a sound)
  how to gather statistics to base categorization
    analyze incoming data (e.g. incoming email)
    analyze what data is looked at and for how long
    analyze physical reactions of the user to the data (e.g. eye movements, mouse movements, etc.)
    analyze what is done with the data (i.e. user action: open, delete, move, copy, reply, forward, move and forward, etc.)
    analyze outgoing data (e.g. outgoing email)
  how to use statistics
    gather list of words, phrases, types, and rules (attributes)
    train on "weighting" of each attribute for each user action
    for new incoming data, compute "weighting" of the data for each user action
    apply each user action with a minimum "weighting" threshold
  If the user can be clustered into a group (e.g. workgroup, division, company, isp), then the data gathered on the group can be combined and shared among the group.

Another embodiment provides methods to detect if messages are sent in bulk and to measure whether a message is wanted by users.
Description
Used to detect sameness and also used to detect offensive content.
Instead of statistically determining whether the sender A of message B is the same as sender C of message D, provide mechanisms for sender A and sender C to easily, uniquely, and securely identify themselves.

A. Methods for owner of unforgeable date to provide a key:
Some information in the message is difficult to forge:
IP addresses, domain names, phone numbers, postal addresses, email addresses, etc.
We want to allow the owner of the unforgeable data to provide a key which is required when the unforgeable data is used in a message and whose presence authenticates the data.
The key can either be provided:
  1. Within the message as a password. (e.g. http://www.eweek.com/article2/0,4149,1433675,00.asp)
  2. Provided as a third party database. (e.g. http://spf.pobox.com/faq.html)
For example, for the owner of the sending IP address:
  1. All messages sent from that IP address will have a dynamic password which is a function of the domain name of the From: address. The secret key to authenticate the password is stored on a public secure server.
  2. or the owner of the domain name of the From: address adds to a third party database (e.g. DNS record) the list of IP addresses which mail can be sent from.

B. Methods for the owner to embed the "password" into the message:
The sender of the message can either embed the password in the message as:
  a fixed arbitrary "password"
  a dynamic "password" which is a function of the message content
  a specific "From:" address
  a specific domain name, phone number, postal address, or email address C. Methods to secure the "password":
Third-party databases such as DNS which are controlled by the owner of the domain names or via a public database of public keys on a secure server. The owner of the unforgeable data needs to authenticate themselves via a trusted authority, mechanism, or bond before they can modify their public key.

It should be easy or even transparent for the email senders to setup, for the ISPs to setup, and for any third-party databases to be setup. Ideally, the spammers will not be able to forge any email message but we may sacrifice that and live with making it uneconomical for spammers to forge many email addresses in return for ease of setup.
In order of ease:
  end-users specify their email address (e.g. joe@domain.com) and their email address name (e.g. "Joe Guy") in a third-party database of one-way hashes. The message is allowed if and only if the email address and the name matches. A confirmation message is sent to the specified email address to verify it.
  end-users specify their email address (e.g. joe@domain.com) and an arbitrary password in a third-party database. The password must be embedded into the message (e.g. "Signed: KSDFH" in the signature). The message is allowed if and only if the email address and the password matches. The password can also be a phone number, postal address, or an email address which could be in a signature.
A message is sent to the specified email address to verify it.
  The owner of the domain name specifies the list of IP addresses which are allowed.
A message is sent to the specified email address of the domain owner to verify it or it can be part of the DNS system.
  The owner of the IP address specifies the list of email addresses/domains which are allowed.

A message is sent to the specified email address of the IP address owner to verify it.
    The entire message is crypographically signed. (e.g. PGP or S/MIME).
Another embodiment uses email sent to non-existent email addresses as a probe of a network.
Description
See U.S. Pat. No. 6,052,709
In a system and method and system for controlling delivery of unsolicited electronic mail messages, some or all email messages addressed to non-existent users at various sites on the communications network are relayed to a spam control center. Upon receipt of incoming mail addressed to the non-existent addresses, the spam control center automatically analyzes the received spam e-mail to identify the source of the message, extracts the spam source data from the message, and generates an alert signal containing the spam source data. This alert signal is broadcast to all network servers and/or all user terminals within the communications network. A filtering system implemented at the servers and/or user terminals receives the alert signal, updates stored filtering data using the spam source data retrieved from the alert signal, and controls delivery of subsequently-received e-mail messages received from the identified spam source. The filtering system controls delivery of the unsolicited e-mail messages by discarding the messages without displaying them to the user, displaying the messages to the user with a "JUNK" or similar marker, or otherwise processing the spam mail as desired by the network provider and/or the network users. The filtering system may also filter e-mail messages sent by the user terminals.
Problem:
    how to collect spam messages
    how to determine that they are in fact spam messages
    how to avoid collecting legitimate private messages
    how to avoid collecting legitimately mis-addressed messages
    how to extract useful information from the collected messages
Solution:
    how to collect spam messages
        Some or all email messages addressed to non-existent users are collected and relayed to a spam control center. Generally, most of these messages are spam. To avoid legitimately mis-addressed messages, only messages whose To: addresses are not even close to existing user addresses are collected. The closeness is configurable. In many cases, the volume of messages addressed to non-existent users is very large. To improve efficiency, one or more of the following methods can be used:
        Only send a random sample (e.g. 10% or 100 k/second)
        Only send a sample of messages which would not have been caught by spam content rules
        Only send a profile of the messages based on extracted attributes
        Only send a sample of messages which are the least likely to be mis-addressed legitimate messages*.
        Only send messages which have been identified to be bulk
        Allow a whitelist and blacklist of senders and recipients not to be sent
    how to determine that they are in fact spam messages
Some messages can be genuinely mis-addressed legitimate messages.
    Only collect messages whose To: addresses are not even close* to legitimate user addresses.
    Only collect messages identified as bulk
    Allow a whitelist and blacklist of senders and recipients not to be sent
    how to avoid collecting legitimate private messages
        Do not collect any messages addressed to legitimate existing email addresses
        Avoid collecting messages which are close* to legitimate email addresses
        Only collect bulk email messages
    how to avoid collecting legitimately mis-addressed messages
        Measure the distance between the collected email address and the set of legitimate email addresses. Do not collect if they are close* which is configurable.
    how to extract useful information from the collected messages
        Extract spam content, spam tricks, spam URLs, spam routing,
        Forge-resistent data: IP addresses, URLs, URL fragments, phone numbers, email addresses, message fingerprints, attachment fingerprints, bulkiness, etc.
        Viewable data: viewable words/phrases in From:, To:, Subject:, and Body
        Frequency of rule hits and word hits
        Trace forge-resistent data: owner of IP addresses, location of IP addresses, owner of domain names, domain registrars, name servers, spider web pages of URLs, check mail server banner of mail servers, reverse lookup phone numbers, etc.
Advantages over prior art probe network:
    Larger sample size so more statistical accuracy
    Avoids collecting legitimate mis-addressed messages
    Allows a whitelist and blacklist of senders and recipients not to be included
    Efficiently and more securely extracts useful information at the client site and sends only derived attributes instead of transferring large volume of private information to spam control center.
*Closeness of two addresses can be computed by counting the number of transformations required to convert from one address to another:
    add characters
    replace characters
    insert characters
Another embodiment includes using email sent to non-existent email addresses as a probe network.
Description
Like Brightmail's probe network:
http://www.delphion.com/details?pn=US06052709
In a system and method and system for controlling delivery of unsolicited electronic mail messages, some or all email messages addressed to non-existent users at various sites on the communications network are relayed to a spam control center. Upon receipt of incoming mail addressed to the non-existent addresses, the spam control center automatically analyzes the received spam e-mail to identify the source of the message, extracts the spam source data from the message, and generates an alert signal containing the spam source data. This alert signal is broadcast to all network servers and/or all user terminals within the communications network. A filtering system implemented at the servers and/or user terminals receives the alert signal, updates stored filtering data using the spam source data retrieved from the alert signal, and controls delivery of subsequently-received e-mail messages received from the identified spam source. The filtering system controls delivery of the unsolicited e-mail messages by discarding the messages without displaying them to the user, displaying the messages to the user with a "JUNK" or similar marker, or otherwise processing the spam mail as desired by the network provider and/or the network users. The filtering system may also filter e-mail messages sent by the user terminals.

Problem:
- how to collect spam messages
- how to determine that they are in fact spam messages
- how to avoid collecting legitimate private messages
- how to avoid collecting legitimately mis-addressed messages
- how to extract useful information from the collected messages Solution:
- how to collect spam messages
  - Some or all email messages addressed to non-existent users are collected and relayed to a spam control center. Generally, most of these messages are spam.
  - To avoid legitimately mis-addressed messages, only messages whose To: addresses are not even close to existing user addresses are collected. The closeness is configurable. In many cases, the volume of messages addressed to non-existent users is very large. To improve efficiency, one or more of the following methods can be used:
    - Only send a random sample (e.g. 10% or 100 k/second)
    - Only send a sample of messages which would not have been caught by spam content rules
    - Only send a profile of the messages based on extracted attributes
    - Only send a sample of messages which are the least likely to be mis-addressed legitimate messages*.
    - Only send messages which have been identified to be bulk
    - Allow a whitelist and blacklist of senders and recipients not to be sent
- how to determine that they are in fact spam messages
  - Some messages can be genuinely mis-addressed legitimate messages.
  - Only collect messages whose To: addresses are not even close* to legitimate user addresses.
  - Only collect messages identified as bulk
  - Allow a whitelist and blacklist of senders and recipients not to be sent
- how to avoid collecting legitimate private messages
  - Do not collect any messages addressed to legitimate existing email addresses
  - Avoid collecting messages which are close* to legitimate email addresses
  - Only collect bulk email messages
- how to avoid collecting legitimately mis-addressed messages
  - Measure the distance between the collected email address and the set of legitimate email addresses. Do not collect if they are close* which is configurable.
- how to extract useful information from the collected messages
  - Extract spam content, spam tricks, spam URLs, spam routing,
  - Forge-resistent data: IP addresses, URLs, URL fragments, phone numbers, email addresses, message fingerprints, attachment fingerprints, bulkiness, etc.
  - Viewable data: viewable words/phrases in From:, To:, Subject:, and Body
  - Frequency of rule hits and word hits
  - Trace forge-resistent data: owner of IP addresses, location of IP addresses, owner of domain names, domain registrars, name servers, spider web pages of URLs, check mail server banner of mail servers, reverse lookup phone numbers, etc.

Advantages over Brightmail's probe network:
- Larger sample size so more statistical accuracy
- Avoids collecting legitimate mis-addressed messages
- Allows a whitelist and blacklist of senders and recipients not to be included
- Efficiently and more securely extracts useful information at the client site and sends only derived attributes instead of transferring large volume of private information to spam control center.

*Closeness of two addresses can be computed by counting the number of transformations required to convert from one address to another:
- add characters
- replace characters
- insert characters Although the invention has been discussed with reference to specific embodiments thereof, these embodiments are illustrative, and not restrictive, of the invention. For example, although the invention is discussed primarily with respect to email messages, other types of information exchange or transfer can similarly benefit. For example, so-called pop-up web pages or dialog boxes can be subjected to sameness testing and filtering. Items attached to email messages can be analyzed as can web pages, files, images, or other data items or structures.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium or transmission that can contain, store, communicate, propagate, or transport the program for use by or in connection with the instruction execution system, apparatus, system or device. The computer readable carrier can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in the following claims and/or to the particular embodiment disclosed as the best mode contemplated for carrying out this invention, but that the invention will include any and all embodiments and equivalents falling within the scope of the appended claims.

What is claimed is:

1. A computer-implemented method for analyzing an email message to determine the likelihood that the email message is spam, the method comprising:
    (a) for each of a plurality of message attributes, determining a message attribute occurrence frequency within a collection of known spam email messages, the message attribute occurrence frequency specifying how often one of the plurality of message attributes occurs in the collection of known spam email messages;
    (b) for each of the plurality of message attributes, determining a message attribute occurrence frequency within a collection of known non-spam email messages;
    (c) determining a spam probability weight for each of the plurality of message attributes based at least in part on the determined message attribute occurrence frequencies determined at steps (a) and (b),
        wherein step (c) comprises, when determining the spam probability weight for each of the plurality of message attributes,
        (c.1) weighting more highly newer email messages within the collection of known spam email messages than older email messages within the collection of known spam email messages, and
        (c.2) weighting more highly newer email messages within the collection of known non-spam email message than older email messages within the collection of known non-spam email messages,
            wherein the weighting more highly newer email messages within the collection of known non-spam email messages at (c.2) is to a lesser extent than the weighting more highly newer email messages within the collection of known spam messages at (c.1):
    (d) detecting a further email message;
    (e) identifying which, if any, of the message attributes are associated with the further email message; and
    (f) determining a value indicative of a likelihood that the further email message is spam based at least in part on the message attributes identified at step (e) as being associated with the further email message and spam probability weights corresponding to the identified message attributes;
        wherein at least step (f) is performed using a hardware processor.

2. The method of claim 1, wherein:
step (c) comprises adjusting the spam probability weights for at least some of the message attributes based on how difficult it is to falsify the message attributes.

3. The method of claim 2, wherein:
step (c) comprises increasing the weights of message attributes that are difficult to falsify and reducing the weights of message attributes that are easy to falsify.

4. The method of claim 3, wherein message attributes that are email addresses, layout fingerprints, message fingerprints and attachment fingerprints.

5. The method of claim 1, wherein:
step (c) comprises weighting more highly message attributes associated with viewable data than message attributes associated with non-viewable data.

6. The method of claim 1, wherein:
step (c) comprises weighting more highly message attributes that comprise words, in viewable text, that are in a dictionary than message attributes that comprise words, in viewable text, that are not in the dictionary.

7. The method of claim 1, further comprising:
detecting additional email messages, and repeating steps (d), (e) and (f) for each of the additional email messages.

8. The method of claim 7, further comprising:
(g) adjusting the plurality of message attributes as new spam email messages are added to the collection of spam email messages, the adjusting comprising one or more of adding new message attributes to the plurality of message attributes and deleting message attributes from the plurality of message attributes, to accommodate changing types of spam email messages.

9. The method of claim 8, wherein:
step (g) comprises deleting attributes with the least usefulness from the plurality of message attributes, when the number of attributes for the plurality of spam email messages exceeds a specified maximum.

10. The method of claim 1, further comprising, prior to steps (a), (b), and (c):
normalizing each of the spam and non-spam messages; and
un-obfuscating the normalized email messages.

11. The method of claim 1, wherein the steps are performed by one or more hardware processors.

12. A non-transitory machine-readable storage medium including instructions executable by a processor for analyzing an email message to determine the likelihood that the email message is spam, the machine-readable storage medium comprising:
one or more instructions for determining a message attribute occurrence frequency within a collection of known spam email messages for each of a plurality of message attributes, the message attribute occurrence frequency specifying how often one of the plurality of message attributes occurs in the collection of known spam email messages;
one or more instructions for determining a message attribute occurrence frequency within a collection of known non-spam email messages for each of the plurality of message attributes;
one or more instructions for determining a spam probability weight for the message attributes based at least in part on the determined message attribute occurrence frequencies determined for each of the plurality of message attributes within the collection of known spam messages and within the collection of known non-spam messages,
wherein the one or more instructions for determining the spam probability weight for each of the plurality of message attributes comprises one or more instructions for,
weighting more highly newer email messages within the collection of known spam email messages than older email messages within the collection of known spam email messages, and
weighting more highly newer email messages within the collection of known non-spam email messages than older email messages within the collection of known non-spam email messages,
wherein the weighting more highly newer email messages within the collection of known non-spam email messages is to a lesser extent than the weighting more highly newer email messages within the collection of known spam messages;
one or more instructions for detecting a further email message;
one or more instructions for identifying which, if any, of the message attributes are associated with the further email message; and
one or more instructions for determining a value indicative of a likelihood that the further email message is spam, based at least in part on the identified message attributes for the further email message and spam probability weights corresponding to the identified message attributes.

13. The machine readable storage medium of claim 12, wherein:
the one or more instructions for determining a spam probability weight comprises one or more instructions for adjusting the spam probability weights for at least some of the message attributes based on how difficult it is to falsify the message attributes.

14. The machine readable storage medium of claim 13, wherein:
the one or more instructions for determining a spam probability weight comprises one or more instructions for increasing the weights of message attributes that are difficult to falsify and reducing the weights of message attributes that are easy to falsify.

15. The machine readable storage medium of claim 14, wherein message attributes that are difficult to falsify comprise one or more of IP addresses, URLs, URL fragments, phone numbers, email addresses, layout fingerprints, message fingerprints and attachment fingerprints.

16. The machine readable storage medium of claim 12, wherein:
the one or more instructions for determining a spam probability weight comprises one or more instructions for weighting more highly message attributes associated with viewable data than message attributes associated with non-viewable data.

17. The machine readable storage medium of claim 12, wherein:
the one or more instructions for determining a spam probability weight comprises one or more instructions for weighting more highly message attributes that comprise words, in viewable text, that are in a dictionary than message attributes that comprise words, in viewable text, that are not in the dictionary.

18. The machine readable storage medium of claim 12, further comprising:
one or more instructions for adjusting the plurality of message attributes as new spam email messages are added to the collection of spam email messages, the adjusting comprising one or more of adding new attributes to the plurality of message attributes and deleting message attributes from the plurality of message attributes, to accommodate changing types of spam email messages.

19. The machine readable storage medium of claim 18, further comprising:
one or more instructions for deleting message attributes with the least usefulness from the plurality of message attributes, when the number of message attributes for the collection of spam email messages exceeds a specified maximum.

20. The machine readable storage medium of claim 12, further comprising:
one or more instructions for normalizing each of the spam and non-spam messages; and
one or more instructions for un-obfuscating the normalized email messages.

21. A system for analyzing an email message to determine the likelihood that the email message is spam, the system comprising at least one processor and memory, and a non-transitory computer-readable medium having thereon one or more programs, which when executed by the at least on processor, cause the system to:
  determine a message attribute occurrence frequency within a collection of spam email messages for each of a plurality of message attributes, the message attribute occurrence frequency specifying how often one of the plurality of message attributes occurs in the collection of known spam email messages rather than how often the one of the plurality of message attributes occurs in an individual spam email message;
  determine a message attribute occurrence frequency within a collection of non-spam email messages for each of the plurality of message attributes;
  determine a spam probability weight for each of the plurality of message attributes based at least in part on the determined message attribute occurrence frequencies determined for each of the plurality of message attributes, wherein determine a spam probability weight for each of the plurality of message attributes weights more highly newer email messages within the collection of known spam email messages than older email messages within the collection of known spam email messages, and
  weights more highly newer email messages within the collection of known non-spam email messages than older email messages within the collection of known non-spam email messages, but to a lesser extent than newer email messages are weighted more highly within the collection of known spam email messages;
  detect a further email message;
  identify which, if any, of the message attributes are associated with the further email message; and
  determine a value indicative of a likelihood that the further email message is spam based at least in part on the identified message attributes and for the further email message corresponding spam probability weights corresponding to identified message attributes.

* * * * *